United States Patent [19]

Murray

[11] 4,275,624

[45] Jun. 30, 1981

[54] INTERNAL ADJUSTABLE GROOVING BAR

[75] Inventor: John T. Murray, San Jose, Calif.

[73] Assignee: United Centrifugal Pumps, San Jose, Calif.

[21] Appl. No.: 84,089

[22] Filed: Oct. 12, 1979

[51] Int. Cl.³ .................... B23B 41/00; B23B 51/00
[52] U.S. Cl. ......................................... 82/1.2; 408/152
[58] Field of Search ............... 82/1.2, 1.3, 1.4, 1.5; 408/147, 152

[56] References Cited

U.S. PATENT DOCUMENTS

| 2,247,283 | 6/1941 | Young | 82/1.2 |
|---|---|---|---|
| 2,284,336 | 5/1942 | Morrison | 82/1.2 |
| 2,409,578 | 10/1946 | McDonald | 82/1.2 |
| 2,744,423 | 5/1956 | Edena et al. | 408/147 |
| 3,599,517 | 8/1971 | Muller | 408/152 |

*Primary Examiner*—Harrison L. Hinson
*Attorney, Agent, or Firm*—Robert G. Slick

[57] ABSTRACT

A grooving bar is provided for machining grooves on the inside surface of a casting or the like, such as the split casing for a pump. The grooving bar of the present invention can be inserted into a casing, adjusted for a precision cut and moved from one cutting location to the next. In accordance with one embodiment of the invention, a geared-down adjustment mechanism is provided for precise feeding of the cutting tool.

7 Claims, 9 Drawing Figures

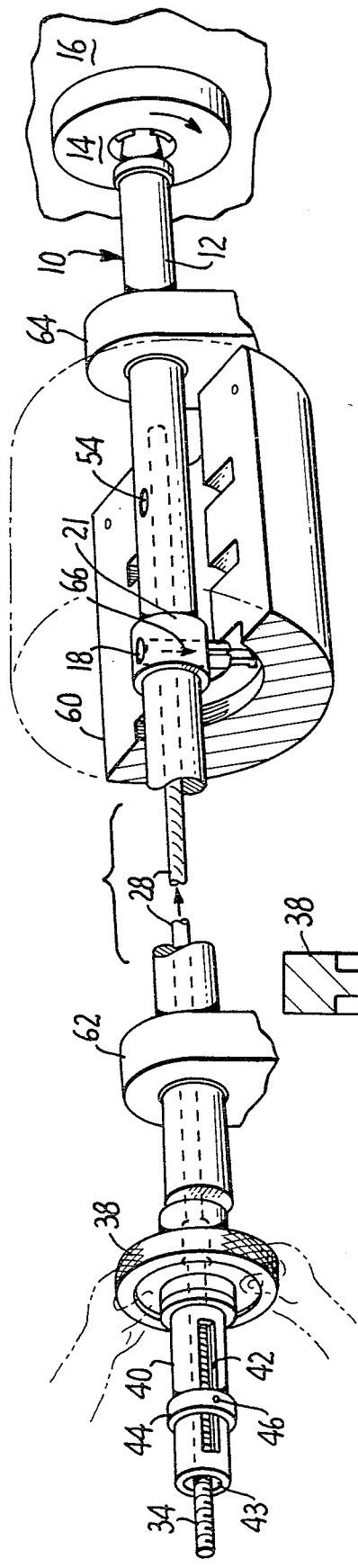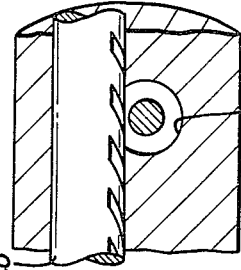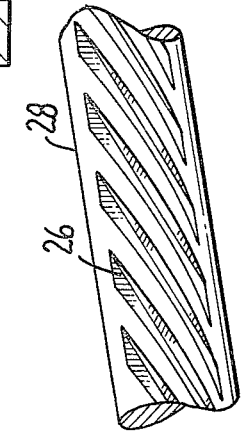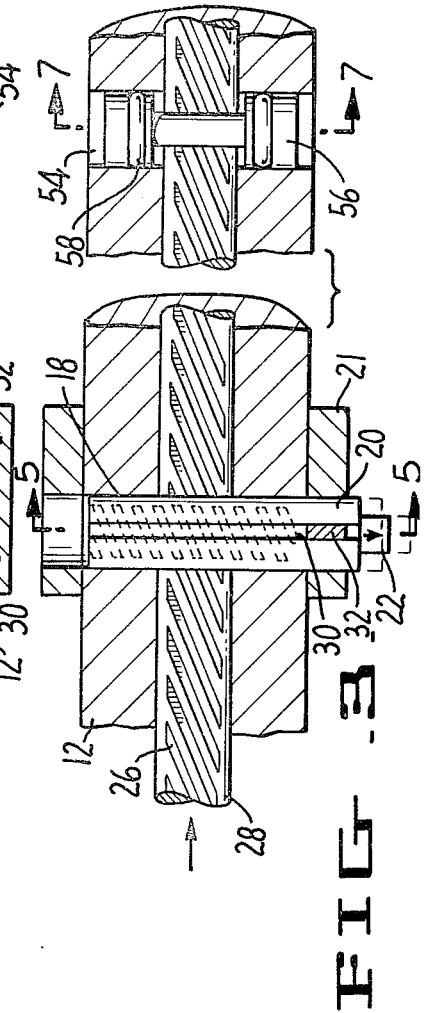

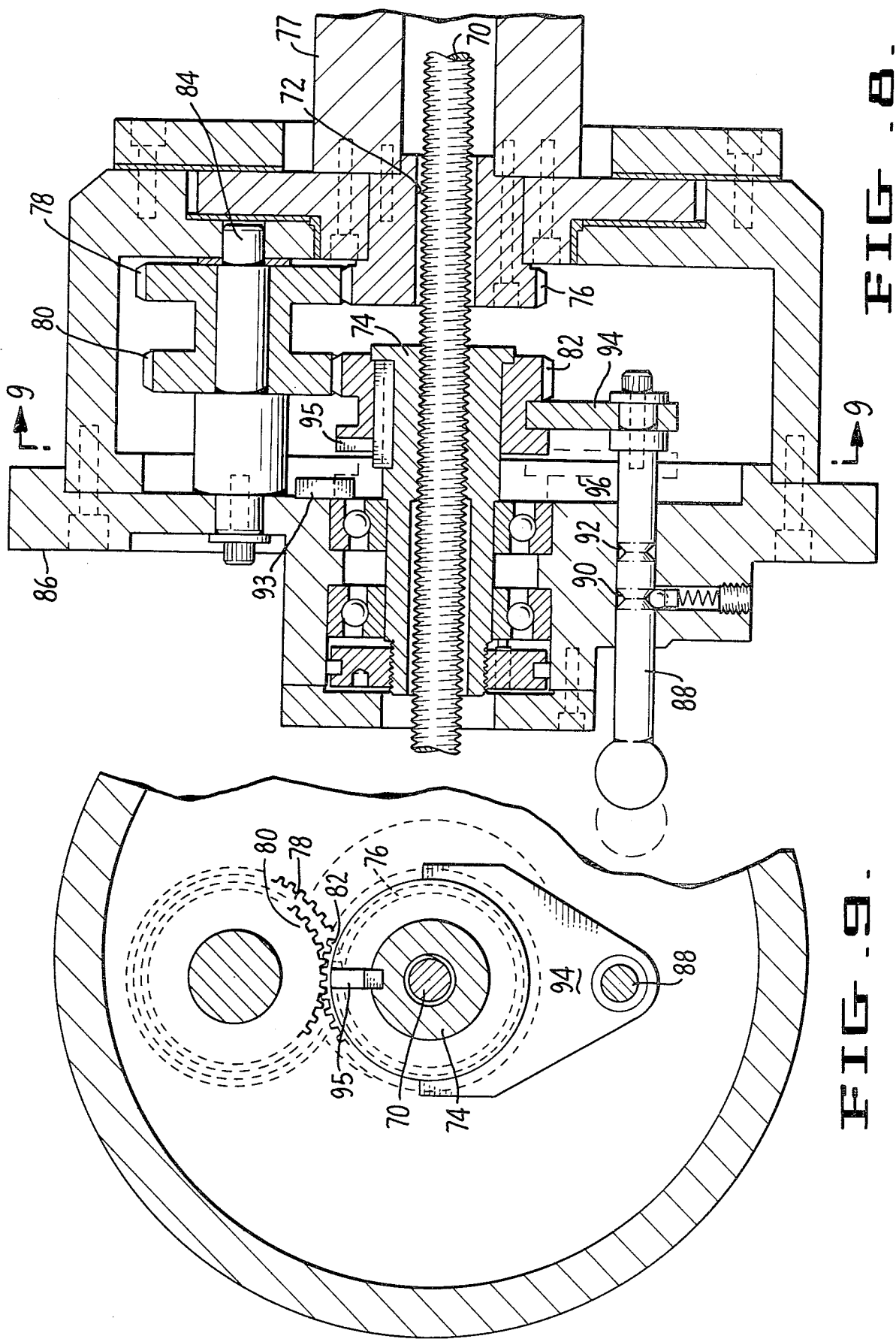

INTERNAL ADJUSTABLE GROOVING BAR

SUMMARY OF THE INVENTION

In many machining operations it is necessary to machine or groove the inner surface of a casting or the like. The present invention provides an adjustable boring bar which can be inserted into such a chamber and the cutting tool extended, i.e. fed from the outside, so that it is not ordinarily necessary to take the casing apart while feeding the tool.

In accordance with the present invention, a very precise form of feeding is provided wherein the tool holder and the draw bar are provided with teeth somewhat along the lines of the teeth on a worm gear so that a sliding motion of the draw bar is transmitted at an angle of 90° to the tool holder. In this manner a simple, yet rugged, feeding device is provided which is capable of precise adjustments.

In accordance with one embodiment of the invention, stop means are provided so that the boring bar can be preset to a given depth to avoid any possibility of ruining a casing by the improper feeding, resulting in the cutting of too deep a groove.

In accordance with another embodiment of the invention, a geared-down feed adjustment is provided for the draw bar, giving even more precise control of the position of the cutting tool to provide for precise feeding and substantially preventing feeding at too fast a rate.

Various other features and advantages of the invention will be brought out in the balance of the specification.

BRIEF DESCRIPTION OF THE DRAWINGS

FIG. 1 is a perspective view of a grooving bar embodying the present invention showing how it is applied to grooving the internal surface of a pump casing. (The top of the casing has been removed for clarity of illustration.)

FIG. 2 is an enlarged sectional view of the grooving bar of the present invention.

FIG. 3 is a sectional view through the tool holder.

FIG. 4 is an enlarged partial prespective view of the draw bar.

FIG. 8 is a sectional view of an alternate type of feeding head.

FIG. 9 is a section on the line 9—9 of FIG. 8.

DESCRIPTION OF THE PREFERRED EMBODIMENTS

Figure 5:
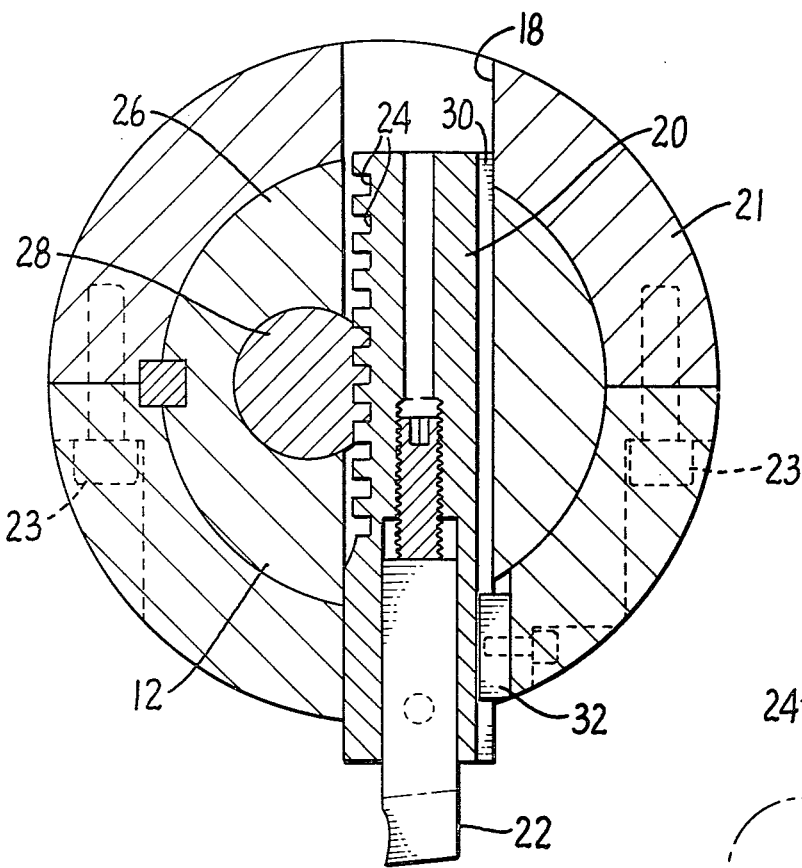
FIG. 5 is an enlarged section on the line 5—5 of FIG. 3.
Figure 6:
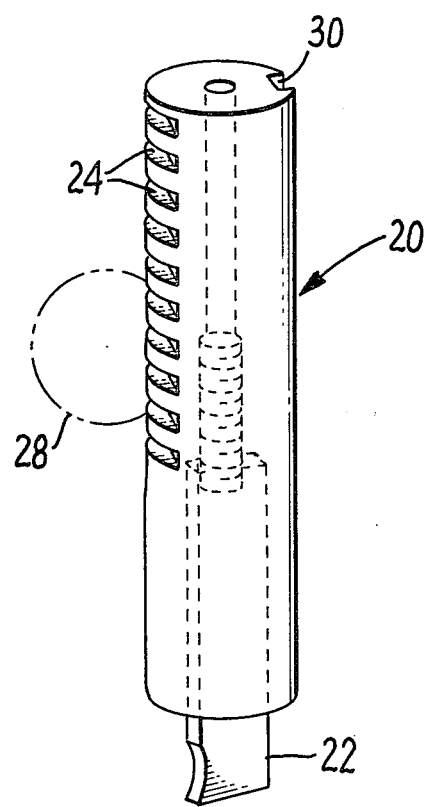
FIG. 6 is an enlarged perspective view of a tool holder.
Figure 7:
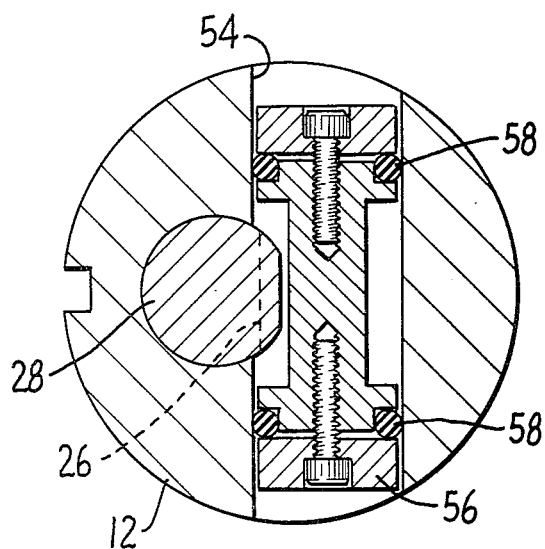
FIG. 7 is a section on the line 7—7 of FIG. 3.

The grooving bar is generally designated 10 and consists of a steel bar 12 which is adapted to be grasped by the spindle 14 of horizontal boring mill 16 and rotated. The bar has one or more radial holes 18 adapted to receive a tool holder 20 which holds a cutting tool 22. Collar 21 is clamped to bar 10 by machine screws 23 to steady the tool holder. Obviously, the depth of cut can be adjusted by moving holder 20 to a desired position in the hole 18. In order to accomplish this movement, the tool holder 20 is provided with a plurality of teeth 24 and these mesh with teeth 26 in a draw bar 28. The draw bar 28 can move back and forth in the off-center hole 18 in bar 12. As can best be seen in FIGS. 6 and 7, the teeth 24 of the tool holder and the teeth 26 of the draw bar are set at a complimentary angle so that as the draw bar is moved back and forth this movement is translated into a movement by the tool holder 20 at right angles thereto. The tool holder 20 has a keyway 30 and a complementary key 32 fastened in collar 21 prevents the tool holder 20 from rotating but permits it to slide back and forth.

The draw bar 28 is attached to a threaded shaft 34 and this passes through the threaded hub 36 of the hand wheel 38. The hand wheel 38 can thus be turned to move the threaded rod 34 back and forth, although as is later explained, in actual practice the hand wheel is held still while the bar turns to move rod 34. Extending beyond hub 36 is a tubular member 40 having a slot 42 therein and internal threads 43. A collar 44 can be locked by set screw 46 which extends into slot 45 in threaded collar 48 which mates with threads 43. In this way, collar 48 can be moved back and forth in tube 40. Jam nuts 50 and 52 are threaded on shaft 34, and it will be obvious that by adjusting the position of these nuts relative to the internal collar 48, the movement of the draw bar 28 can be limited in any desired manner.

Although the grooving bar would only be provided in most situations with a single cutting tool, it might be provided with more than one or provision might be made for moving the cutting tool along the grooving bar. For this purpose, a second opening 54, corresponding to the opening 18, may be provided and when not in use, this opening is closed by a dummy plug 56. Plug 56 is equipped with seals 58 to prevent entry of boring chips when this hole is not in use.

It is believed that the operation of the device is obvious. One would first set up the boring bar with the tool holder 20 in a retracted position and then the material to be worked on, e.g. the lower half 60 of a pump casing would be fastened to the bed of the horizontal boring mill. Normally, the pump casing would have attached thereto outboard supports 62 and 64 to hold the grooving bar steady while permitting it to rotate. The bar would then be locked onto the spindle 14 of the headstock of mill 16, the top half of the casing bolted on, and the horizontal boring mill started. The hand wheel 38 would normally revolve with the bar 12 so that there would be no movement of the draw bar 28 relative to bar 12. The operator would then grasp the hand wheel 38 and hold it momentarily, causing the draw bar to remain stationary while the bar 12 turns and the relative movement would cause draw bar 28 to move, causing the tool holder 20 to move in the direction shown by arrow 66, bringing tool 22 into contact with the work. Although the hand wheel 38 obviously moves in an eccentric path, the speed at which it revolves is such that it is easy to grasp and restrain the wheel.

At the completion of a cut, the wheel can be turned in the opposite direction, withdrawing the tool and the tool can be moved to a new position relative to the work piece. This would ordinarily be accomplished by moving the work piece or the head stock or both. It is not ordinarily necessary to open the work piece prior to moving the work piece to a new position since the tool would be retracted entirely within collar 21.

In many instances, it is desired to achieve more precise control than is possible with the equipment previously described. The modification of the invention shown in FIGS. 8 and 9 permit one to achieve an even more precise control than that previously described. In this embodiment of the invention, the draw bar is designated 70 and it passes through an unthreaded collar 72 into a threaded collar 74. A spur gear 76 is fastened to the boring bar 77. This gear meshes with a spur gear 78 which is on the same shaft as spur gear 80 which in turn engages spur gear 82. Gears 78 and 80 are coupled together and are free to revolve on shaft 84 which is attached to the hand wheel assembly 86. Attached to the hand wheel assembly is a shifting lever 88 which is held in one of two selected positions by the detents 90 and 92. In the position shown in solid lines, the drive is through the spur gears previously described and ratio of the spur gears is selected so that there is a step-down relationship whereby as wheel 86 is restrained, the draw bar 70 is moved less than one lead of the threaded rod 70 for each revolution of the grooving bar. If lever 88 is moved to the left, i.e. to the position shown in dash lines, yoke 94 moves gear 82 out of contact with gear 80 and at the same time key 93 locks into keyway 95 of the hand wheel assembly as is shown at the dash line 96, locking the assembly together. With gears 80 and 82 meshed together the tool holder will feed at a prescribed low rate of feed per revolution of the bar. If the gears are out of mesh and the hand wheel is held stationary, there will not be any feeding of the tool holder. The screw shaft 34 (FIG. 1) and the nut 74 (FIG. 8) would both be rotating at the same R.P.M. In order to have the tool holder feed out, it is necessary to hold the nut temporarily or the nut should have less revolutions per minute than the screw shaft. The purpose of the disengagement of the two gears and the coupling of the keyway 95 and key 93 is to enable one to return the tool holder 20 and cutting tool 22 rapidly.

Although a specific embodiment of the invention has been described, it will be obvious to those skilled in the art that many changes can be made in the structure shown without departing from the spirit of this invention.

I claim:

1. A grooving bar for machining an internal groove on a work piece comprising in combination:
    a. an elongated bar adapted to be held within a cavity of a work piece and revolved therein;
    b. a tool holder and tool adapted to turn with said bar, said tool holder being slideably mounted in a radial passage within said bar;
    c. a draw bar movable within an eccentric passage in said elongated bar axially of said grooving bar and at right angles to said tool holder;
    d. mating teeth on said draw bar and said tool holder whereby movement back and forth on said draw bar will cause said tool holder to move in and out in a positive manner, and
    e. means for moving said draw bar in and out to bring said tool holder in and out of engagement with the interior surface of said work piece.

2. The grooving bar of claim 1 wherein said bar is mounted on a horizontal boring machine.

3. The structure of claim 1 wherein said work piece and said radial passage are movable relative to each other along the axis of the grooving bar whereby the tool can be retracted, moved to a another groove site and extended into said groove site.

4. The structure of claim 1 wherein said draw bar is threaded into a member rotatably mounted on said elongated bar whereby relative rotational movement of said boring bar and said member will cause positive back and forth movement of said draw bar relative to said boring bar.

5. The structure of claim 4 wherein said member is provided with a hand wheel whereby grasping said hand wheel while and boring bar is driven will cause in or out movement of said tool holder.

6. The structure of claim 5 wherein said hand wheel is connected to said boring bar by a reduction gear.

7. The structure of claim 6 having means for locking out said gearing to secure a direct drive between the hand wheel and the threaded member to enable the operator to return said tool holder rapidly by rotating said hand wheel.

* * * * *